United States Patent
Schimmels

(10) Patent No.: US 6,408,531 B1
(45) Date of Patent: Jun. 25, 2002

(54) METHOD AND APPARATUS FOR ASSEMBLING RIGID PARTS

(75) Inventor: Joseph M. Schimmels, Milwaukee, WI (US)

(73) Assignee: Mechsys, L.L.C., Milwaukee, WI (US)

( * ) Notice: Subject to any disclaimer, the term of this patent is extended or adjusted under 35 U.S.C. 154(b) by 0 days.

(21) Appl. No.: 09/488,126

(22) Filed: Jan. 20, 2000

(51) Int. Cl.⁷ .................................................. B23Q 3/18
(52) U.S. Cl. ............................. 33/644; 33/520; 29/428
(58) Field of Search .......................... 33/644, 520, 533, 33/613, 645; 29/893.1, 893, 428, 464, 429; 74/490.06, 479.01, 490.01, 490.05

(56) References Cited

U.S. PATENT DOCUMENTS

| | | | |
|---|---|---|---|
| 4,098,001 A | | 7/1978 | Watson |
| 4,202,107 A | | 5/1980 | Watson |
| 4,242,017 A | | 12/1980 | De Fazio |
| 4,328,621 A | * | 5/1982 | Benjamin ................... 33/613 |
| 4,332,066 A | * | 6/1982 | Hailey et al. ................ 33/520 |
| 4,367,591 A | * | 1/1983 | Hirabayashi et al. ......... 33/644 |
| 4,414,750 A | | 11/1983 | De Fazio |
| 4,549,359 A | * | 10/1985 | Hense et al. .................. 33/520 |
| 4,573,271 A | * | 3/1986 | Hamilton et al. ............. 33/644 |
| 4,627,169 A | | 12/1986 | Zafred et al. |
| 4,803,786 A | | 2/1989 | Cusack |
| 5,148,610 A | | 9/1992 | Cusack |
| 5,396,714 A | | 3/1995 | Sturges, Jr. et al. |
| 5,987,726 A | * | 11/1999 | Akeel ..................... 74/490.06 |

* cited by examiner

Primary Examiner—Christopher W. Fulton
(74) Attorney, Agent, or Firm—Boyle Fredrickson Newholm Stein & Gratz SC

(57) ABSTRACT

A method and apparatus for installing a part such as a gear into an assembly such as a gear set with low-stiffness and low inertia comprises an insertion mechanism that is connected to a controller at one end, and that is connected to the part at a second end. In one embodiment, the insertion mechanism at least permits rotational compliance about the z axis with respect to the controller independent of compliance in the x, y, and z axes to permit the part to mesh with the assembly during the installation process. In another embodiment, the insertion mechanism is compliant only along the x, y, and z axes.

13 Claims, 8 Drawing Sheets

METHOD AND APPARATUS FOR ASSEMBLING RIGID PARTS

BACKGROUND OF THE INVENTION

1. Field of the Invention

The present invention relates to assembly assist mechanisms and, more particularly, relates to a low inertia, low-stiffness method and apparatus for passively inserting a part such as a gear into an assembly such as a gear set.

2. Discussion of the Related Art

Manual assembly tasks, particularly those involving the handling of heavy parts, are often the source of repetitive motion injuries and quality control problems. Flexible automation solutions for a variety of assembly tasks have already been developed and some have been implemented in production. However, many of the automated solutions have proven to be too unreliable for use in production. Tolerances within the assembled parts and variability in part location have prevented sufficiently high success rates.

For example, when inserting a splined gear into a planetary gear set, a significant amount of uncertainty exists as to the relative positions of the gears as a whole, as well as the orientation of the meshing teeth. In some cases, the uncertainty in relative positioning exceeds the clearances between the features at the properly mated position. For example, in the case of gear meshing, the uncertainty of location in one set of gear teeth relative to the other may exceed the clearances between the gear teeth. As a result, the positioning capability of a robot is not sufficient to reliably compensate for the positioning uncertainty. For example, the alignment of gear teeth on two gears can be a very difficult task due to location uncertainty even though the directional alignment of the gears' centerlines are well within the clearance requirements.

Previous robotic assembly assist mechanisms have been proposed that attempt to alleviate some of these problems. Such mechanisms typically are rigidly coupled to a robot arm and to a tool support element that is coupled to a gripper that receives a gear to be installed. The mechanisms may further be configured to permit limited movement of the tool support element relative to the robot arm to accommodate some misalignment of the gear relative to the robot arm. Mechanisms of this type are said to be "compliant" because the tool holder has some freedom of motion relative to the mechanism. Compliance in a given direction reduces the contact force in that direction. However, heretofore-available mechanisms have not been sufficiently compliant with a sufficient number of degrees of freedom to maintain contact and friction forces acceptably low throughout the gear insertion process under all possible insertion conditions. As a result, these insertion mechanisms tend to be unreliable and can risk gear jamming and/or damage to the assembled parts or the gear insertion mechanism. These risks heretofore have been alleviated only by employing relatively complex active controls in the form of feedback control of the robot throughout the insertion process, thereby adding cost and complexity to the system.

OBJECTS AND SUMMARY OF THE INVENTION

It is therefore a first object of the present invention to provide a low inertia, compliant robotic insertion assist mechanism that is operable under control of a controller for inserting a part into an assembly.

It is a second object of the invention to provide a compliant robotic insertion mechanism that reduces the forces necessary to insert parts into assemblies.

It is a third object of the invention to provide a compliant robotic insertion mechanism that has a sufficient number of degrees of freedom relative to the controller to maximize the reliability of the assembly operation and to reduce the forces and corresponding stresses at the point of insertion.

In accordance with a first aspect of the invention, these objects are achieved by providing an assembly assist mechanism configured for the passive insertion of a part such as a gear into an assembly such as a gear set. The insertion mechanism includes a mounting element that is configured for connection to a controller. An output element is in mechanical communication with the mounting element at one end, and is connected to a tool holder at a second, opposite end. The tool holder receives the part that is to be inserted into the assembly. The mechanism is configured to permit vertical movement of the part generally along the z axis relative to the mounting element and independently of rotation of the part about the z axis so as to permit passive insertion of the part into the assembly under low contact force conditions.

It is another object to provide a method for inserting a gear into a gear set using the gear insertion mechanism in accordance with the first object of the invention.

In accordance with a second aspect of the invention, this object is achieved by moving a controller such as a robot arm into a position such that a gear to be inserted is generally aligned with the corresponding gear set. The controller is preprogrammed to lower the arm, thereby also lowering the gear a given distance in the vertical or z direction until the gear contacts the gear set and the insertion mechanism compresses to "prime" the gear for insertion into the gear set. The controller then undergoes a series of rotational iterations to rotate the gear back and forth about the z axis until the teeth on the gear are in meshing alignment with the teeth of the mating gear(s) of the gear set, at which time the gear will passively drop by gravity (and possibly spring biasing forces) into meshing engagement with the mating gear(s) of the gear set. The controller need not directly apply a vertical force to the gear as it is inserted into the gear set. The resulting relatively low forces and consequent low-inertia and low-stiffness insertion minimize the risk that the parts will become damaged during assembly.

Due to the nature of the connection between the components of the insertion mechanism, the gear to be installed may be passively translatable during this insertion process in at least the z direction and in an x-y plane to ensure that it is properly aligned with the gear set and that gear insertion takes place under low inertia and with a minimum of friction. In order to minimize contact and friction forces in applications in which the gear(s) which mate with the gear to be inserted are relatively massive, the insertion mechanism may further permit the gear to passively rotate about the z axis to accommodate limited rotation between the input element of the gear insertion mechanism and the inserted gear and to thereby negate or reduce the need for the gear to drive the mating gear(s) of the gear set. The insertion process requires no active feedback to the controller for its implementation. At most, a limit switch or the like may generate a signal at the end of the process to signify that the gear has been successfully inserted into the gear set.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Pursuant to a preferred embodiment of the invention, an assembly assist mechanism is provided that permits a controller such as a robotic arm to insert a part such as a gear into an assembly such as a gear set. The insertion mechanism includes a mounting element that is rigidly mounted on the controller and an output element that is in mechanical communication with the mounting element and that receives a holder such as a gripper or a chuck. The output element "floats" (i.e., is compliant in several directions of movement) relative to the mounting element so as to permit reliable part insertion while minimizing contact and friction forces thereby virtually eliminating the risk of gear jamming or damage to the assembled parts or the insertion mechanism. Specifically, in the case of a gear insertion mechanism, the output element is passively movable relative to the mounting element so as to accommodate misalignment between the gear to be inserted and the gear set and so as to permit passive insertion of the gear into the gear set.

In operation of a gear insertion mechanism constructed in accordance with the invention, a gear is connected to the gear holder, and the controller is actuated to translate the insertion mechanism in the x and y directions to generally align the axis of the gear with the axis of the gear set, and then lowers the insertion mechanism generally along the z axis until the gear contacts the gear set. The insertion is compliant in the z direction so as to permit relative movement between the mounting element and the output element in the z direction to "prime" the gear for insertion into the gear set after the gear engages the gear set and as the controller and mounting element continue to move toward the gear set while the output element and gear remain stationary. The output element may move in the x and/or y directions at this time relative to the mounting element to accommodate minor misalignment between the axis of the gear and the axis of the gear set. The controller then drives the insertion mechanism through a series of rotational iterations about the z axis until the gear meshes with the mating gear(s) of the gear set and drops into place under gravitational forces. Depending upon the configuration of the gear and gear set, the insertion mechanism may additionally be rotatably compliant about the z axis to permit limited rotation of the output element and gear relative to the mounting element.

Figure 1:
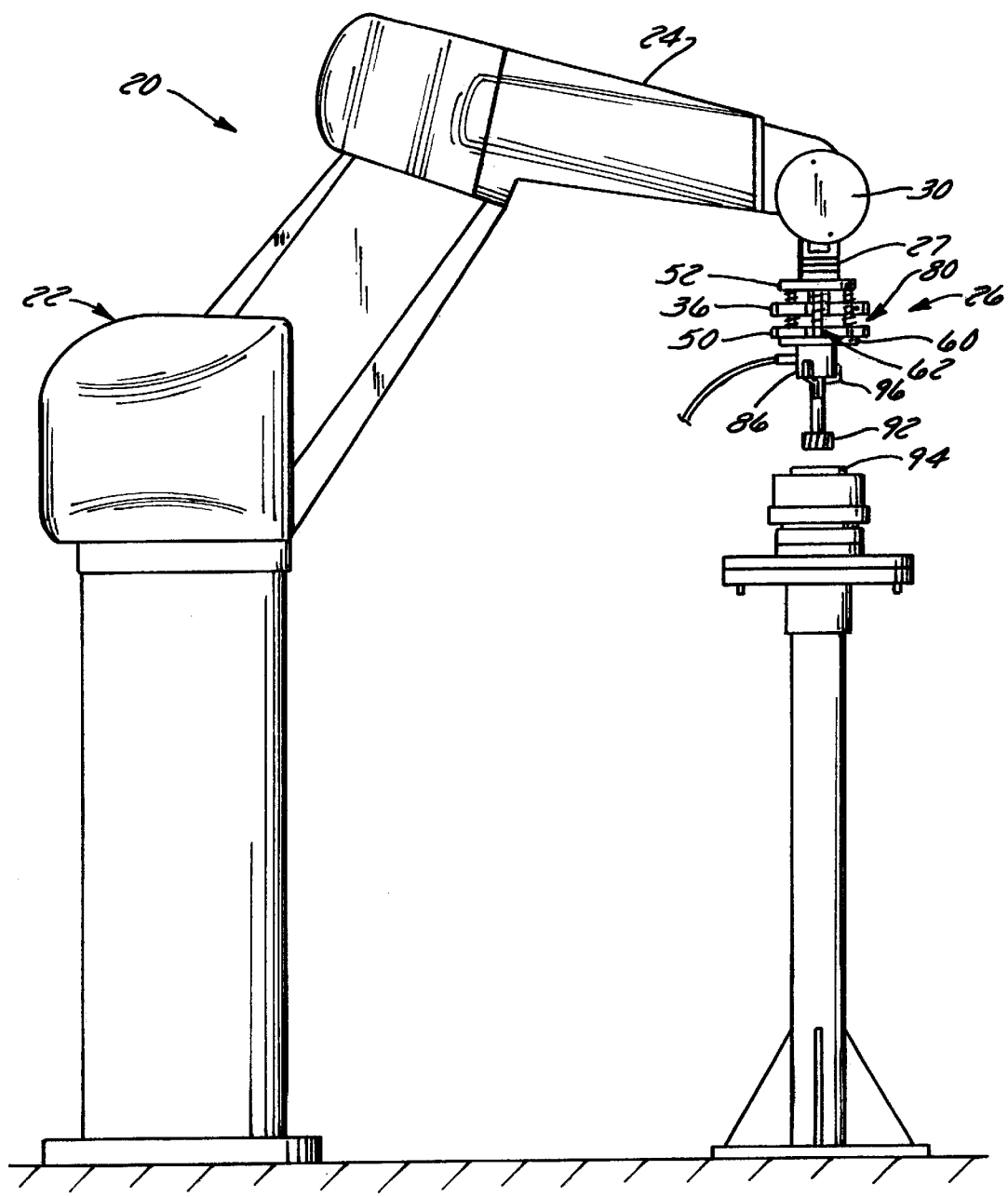
FIG. 1 is a side elevation view of an automated gear assembly apparatus having a gear insertion mechanism constructed in accordance with a first preferred embodiment of the present invention.

1. System Overview and Construction and Operation of First Embodiment Having an Output Element with Four Degrees of Freedom Referring to FIG. 1, an automated gear assembly apparatus 20 constructed in accordance with a first embodiment of the invention is configured to manipulate a tool holder 86 to insert a splined sun gear 92 into a planetary gear set 94 and to thereafter release the gear 92. The apparatus comprises a gear insertion mechanism 26 and a robot 22 that controls operation of the insertion mechanism 26. The robot 22 has a robot arm 24 that is connected to the gear insertion mechanism 26 via a shaft 27 that extends generally vertically downwardly from ajoint 30 on the robot arm 24. The robot 22 is configured to 1) position the gear insertion mechanism 26 at a position in which the gear 92 is generally aligned with the gear set 94, 2) prime the gear 92 for insertion into the gear set 94, 3) rotate the insertion mechanism 26 to a position in which the gear 92 meshes with the mating gear(s) of the gear set 94, and 4) automatically release the gear 92 after a successful insertion operation. The gear insertion mechanism 26 is operable, during robot arm movement, to 1) accommodate any misalignment between the gear 92 and the gear set 94 and 2) provide for the passive insertion of the gear 92 into the gear set 94 with low contact and frictional forces.

The robot 22 and chuck 86 are, per se, well-known. The gear insertion mechanism 26 will now be detailed.

Figure 2:
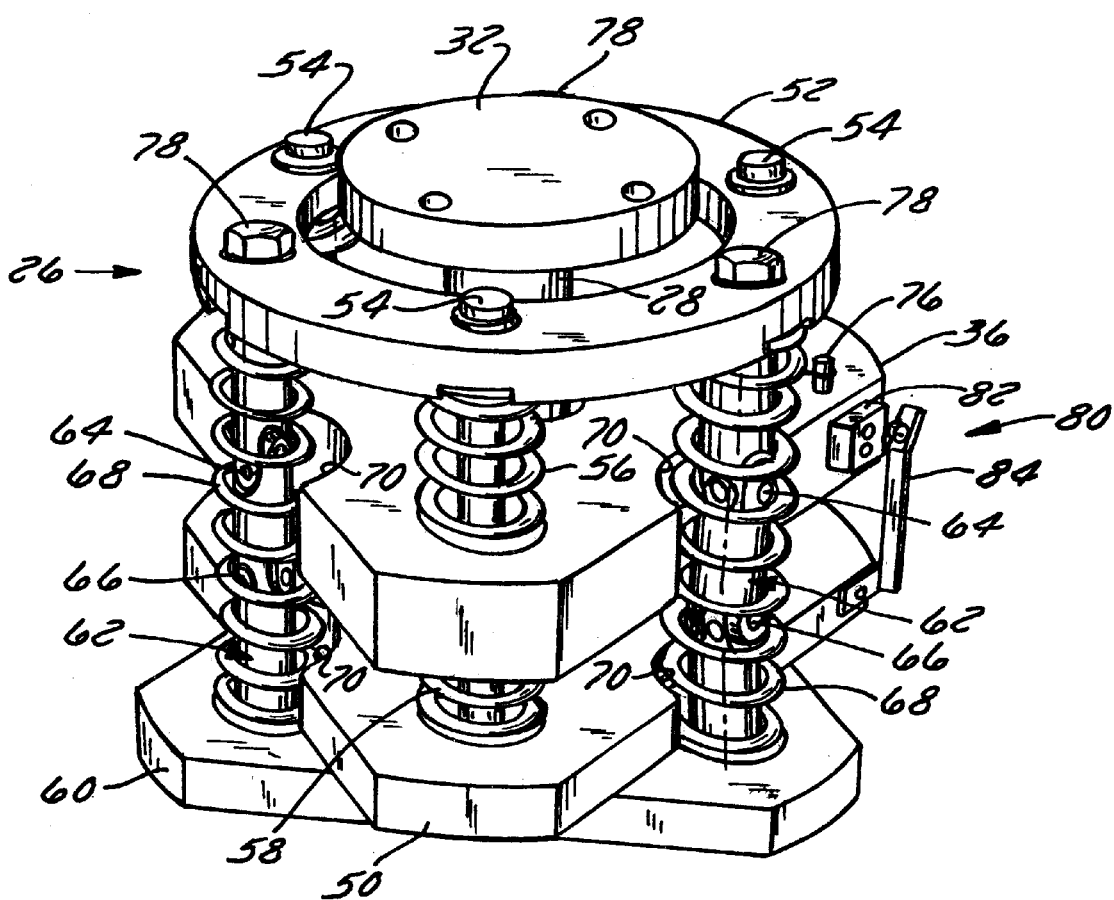
FIG. 2 is a perspective view of the insertion mechanism of the apparatus of FIG. 1.
Figure 4:
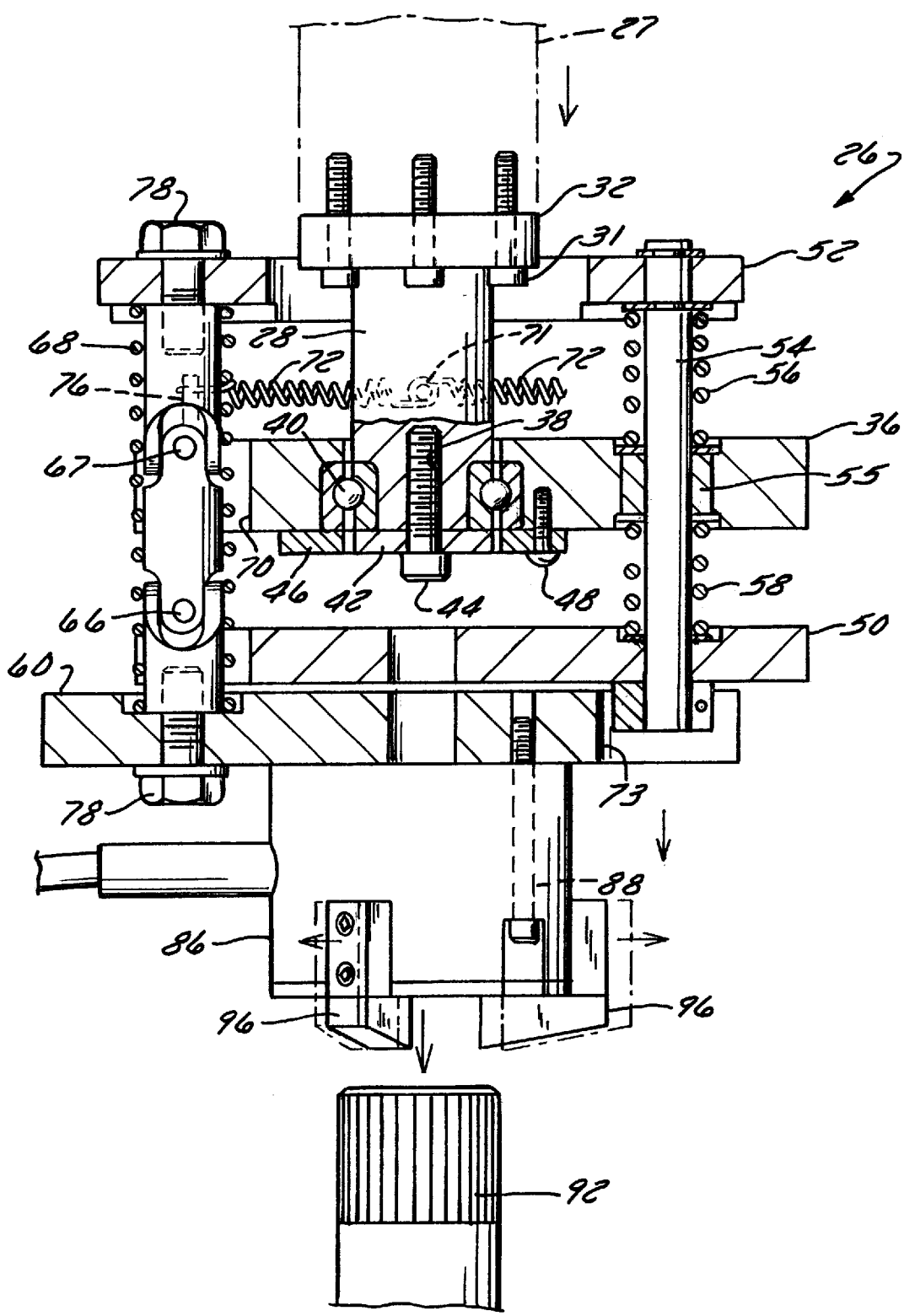
FIG. 4 is a sectional side elevation view of the insertion mechanism of FIGS. 2 and 3 as it receives a gear to be installed into a gear set.

Referring to FIGS. 2 and 4, the gear insertion mechanism 26 comprises a mounting element 32, a main support plate 36 which is fixed from vertical motion with respect to the mounting element 32, and an output element 60 which is configured to support the gear 92 and which is supported on the mounting element 32 so as to have at least three degrees of freedom with respect thereto. More specifically, the mounting element 32 comprises a mounting plate that is rigidly connected to shaft 27 at its upper side and that is connected to a shaft 28 at its lower side via screws 31 (FIG. 4) that are inserted upwardly into the mounting plate 32 and that are threaded into tapped bores in the bottom surface of shaft 27. The main support plate 36 is rotatably mounted on the shaft 28 via a bearing 40 that is fixed to the shaft 28 and to the plate 36 by attachment plates 42 and 46. The attachment plates 42 and 46 are affixed to the shaft 28 and to the main support plate 36 by a main bolt 44 and mounting screws 48, respectively. The main support plate 36 is thereby fixed to the mounting plate 32 with respect to linear motion in the x, y, and z directions but can rotate about the z axis of the insertion mechanism 26 relative to the mounting plate. This rotational movement is resisted by a spring assembly as detailed below.

A bottom plate 50 is disposed below the main support plate 36, and an annular top plate 52 is disposed above the main support plate 36. The inner diameter of top plate 52 is preferably greater than the diameter of the mounting plate 32 so as to fit around the mounting plate 32 as shown in FIGS. 2 and 4. Rigid pins 54 are connected to the top plate 52 by snap rings, extend through a set of linear bearings 55 in the main support plate 36, and are clamped to the bottom plate 50, thereby preventing relative vertical movement between plates 50 and 52 while permitting them to move vertically as a unit relative to the main support plate 36. A first spring 56 surrounds each pin 54 at a location between the top plate 52 and the main support plate 36, and a second spring 58 surrounds each pin 54 at a location between the main support plate 36 and the bottom plate 50, thereby biasing the assembly formed by the plates 50 and 52 towards the position shown in FIG. 4.

The output element 60 comprises an output plate that is disposed beneath the bottom plate 50 and that is suspended from the top plate 52 by a set of double universal joints 62. The double universal joints 62 permit the output plate 60 to rotate with the main support plate 36 while permitting it to move vertically (in the z direction) and horizontally (in the x-y plane) with respect thereto. A spring 68 surrounds each joint 62 and extends between the top plate 52 and the output plate 60. Generally semicircular joint notches 70 are formed in the outer portions of plates 36 and 50 to accommodate the joints 62 and springs 68. In addition, notches 73 are formed in the upper surface of plate 60 to accommodate the ends of pins 54 so that the bottom plate 50 may rest just above the output plate 60 and so that the output plate 60 and the base of the double universal joints 62 may move in the x-y plane relative to the bottom plate 50.

Figure 3:
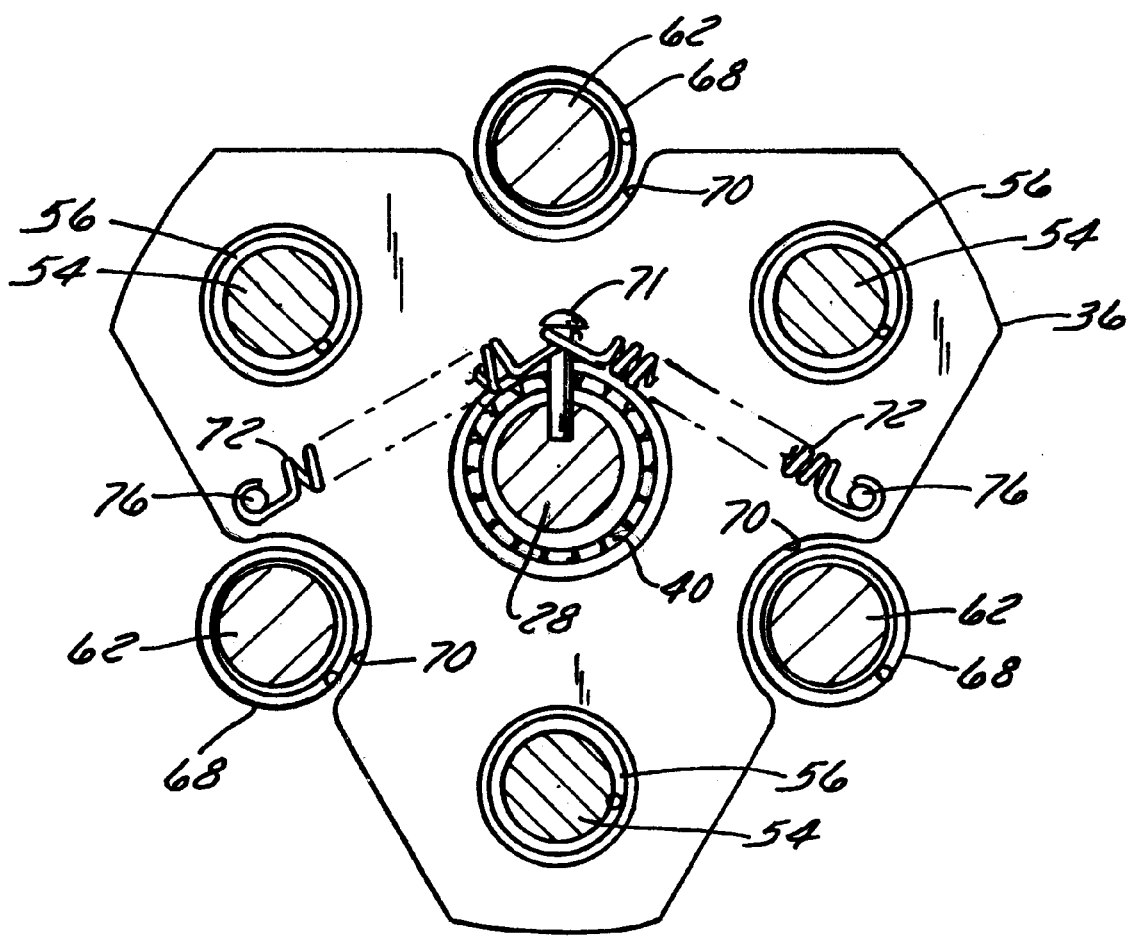
FIG. 3 is a sectional top plan view of the insertion mechanism of FIG. 2.
Figure 5:
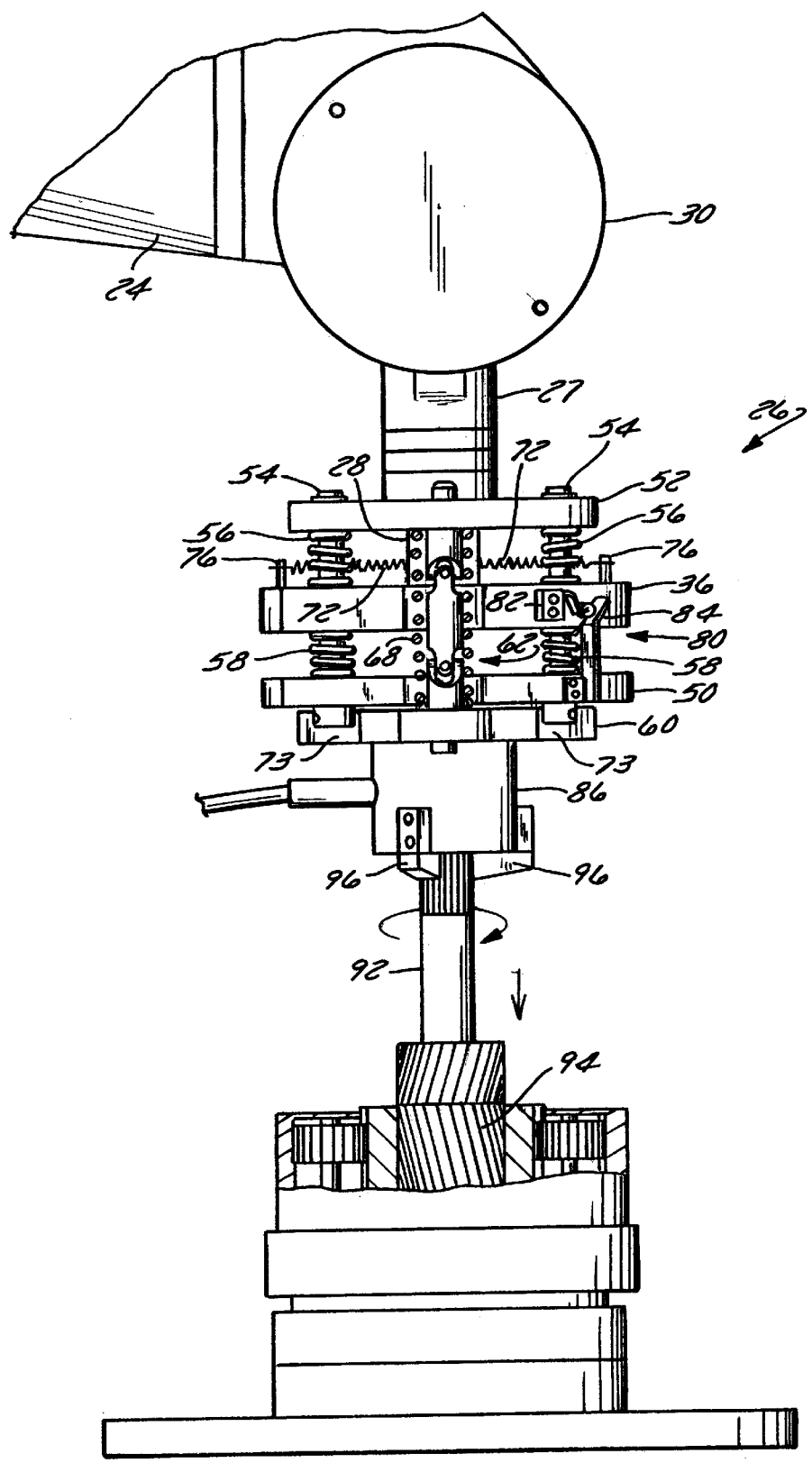
FIG. 5 is a fragmentary side elevation view of the insertion mechanism of FIGS. 2–4 as it inserts the gear into the gear set.

The insertion mechanism 26 also incorporates measures to limit rotation of the main support plate 36 and its supported elements relative to the shaft 28. Referring to FIG. 3 in particular, a fastener in the form of a pin 71 extends outwardly from shaft 28 at a location above the main support plate 36 and is connected to one end of each of a pair of generally horizontally extending springs 72. Referring also to FIG. 5, the opposite end of each spring 72 is connected to a corresponding pin 76 on the upper surface of the main plate 36. The springs 72 limit rotation of the plate 36 relative to the shaft 28 to a few degrees during normal operation.

The tool holder 86, which may comprise a releasable chuck, is mounted to the underside of the output plate 60 via screws 88 (one of which is shown in FIG. 4) that are inserted through corresponding bores in the chuck and that are threaded into tapped bores in the output plate 60. In the illustrated embodiment, the chuck 86 is operable, under a common control system for the robot 22, to pivot gripper fingers 96 thereof to grip the gear 92 during the insertion process and to release the gear 92 after it is inserted into the gear set 94.

Referring again to FIG. 2, the insertion mechanism 26 may also include an indicator for generating a signal indicative of a successful insertion operation. In the illustrated embodiment, the indicator comprises a limit switch 80 which comprises a switch 82 and an actuator arm 84. The switch 82 is mounted on an outer surface of the main support plate 36, and the actuator arm 84 is mounted onto an upper surface of the bottom plate 50 to alternatively engage or disengage the switch 82 depending upon the position of the bottom plate 50 relative to the main support plate. The control system for the robot 22 is configured to be a sequence of limit switch closure followed by limit switch opening to signify a successful gear insertion process.

To recap, the configuration of the gear insertion mechanism 26 permits the output plate 60 to operate with four degrees of freedom relative to the robot arm 24. More particularly, the double universal Joints 62 permit the output plate 60 to translate generally along the x and y axes relative to the robot arm 24, while the springs 58 and 56 and pins 52 permit main support plate translation generally in the z axis relative to the robot arm. Additionally, the bearing 40 and springs 72 permit the main support plate 36, and, therefore, the output plate 60, to rotate about the z axis relative to the robot arm 24. As a result, the output plate 60 is compliant in the x, y, and z directions, and is rotationally compliant about the z axis as will be described in more detail below.

In operation, the splined sun gear 92 is gripped by the chuck 86 as shown in FIG. 4, and the robot 20 then moves its arm 24 in a preprogrammed direction such that the gear 92 is generally aligned with the planetary gear set 94 as shown in FIG. 5. The robot 22 then lowers its arm 24 a preprogrammed distanced along the z axis such that the gear 92 contacts the gear set 94 before the end of the robot arm's downward stroke. As the robot arm 24 continues to lower after the gear 92 contacts and rests on the gear set 94, plates 32 and 36 continue to move downwardly, while plates 50, 52, and 60 remain stationary. The resulting relative vertical movement between 1) plates 50, 52, and 60 and 2) the plates 32 and 36 is limited by the amount of clearance between the upper surface of plate 50 and the lower surface of the plate 42, as shown in FIG. 4. This relative movement places the insertion mechanism 26 in a compressed or "primed" position in which the only forces biasing the gear 92 in the direction of the gear set 94 are the forces of springs 56 and 58, and the force of gravity acting on the gear 92. Because the springs 56 and 58 have a low spring coefficient (approximately four lbs/in in the preferred embodiment), the biasing force is relatively low, thereby permitting a low force insertion process. The limit switch 80 also closes at this time.

Once the robot arm 24 has completed its downward movement, it begins a series of a predetermined number (e.g., four) rotational iterations in order to mesh gear 92 with the gear set 94. In accordance with the preferred embodiment, during each iteration, the robot arm rotates the insertion mechanism 26 in a clockwise direction approximately 30 degrees, followed by a counterclockwise rotation of approximately 15 degrees. Specifically, as the robot arm 24 drives the shaft 28 to rotate, the corresponding rotation of the bolt 71 compresses one of the springs 72, and extends the other spring to drive the plate 36 to rotate about the shaft 28. The rotation of plate 36 likewise drives pins 54 to rotate, which then drives the plates 50 and 52, the double universal joints 62, and the output plate 60 and chuck 86 to rotate.

During this iterative rotation process, the springs 72 reduce frictional forces that would otherwise accumulate during the insertion operation. For instance, if the robot arm 24 directly rotated the output plate 60 and gear 92, frictional forces would develop at the point of contact between the gear 92 and the planetary gear set 94 that may prohibit the successful installation. Additionally, some of the parts could be damaged as a result of the strong forces. When forces within the insertion mechanism 26 begin to accumulate, the springs 72 permit the gear 92 to remain stationary relative to the gear set 94 throughout at least a few degrees of rotation of the robot arm 24, thereby facilitating low-force installation.

Figure 6:
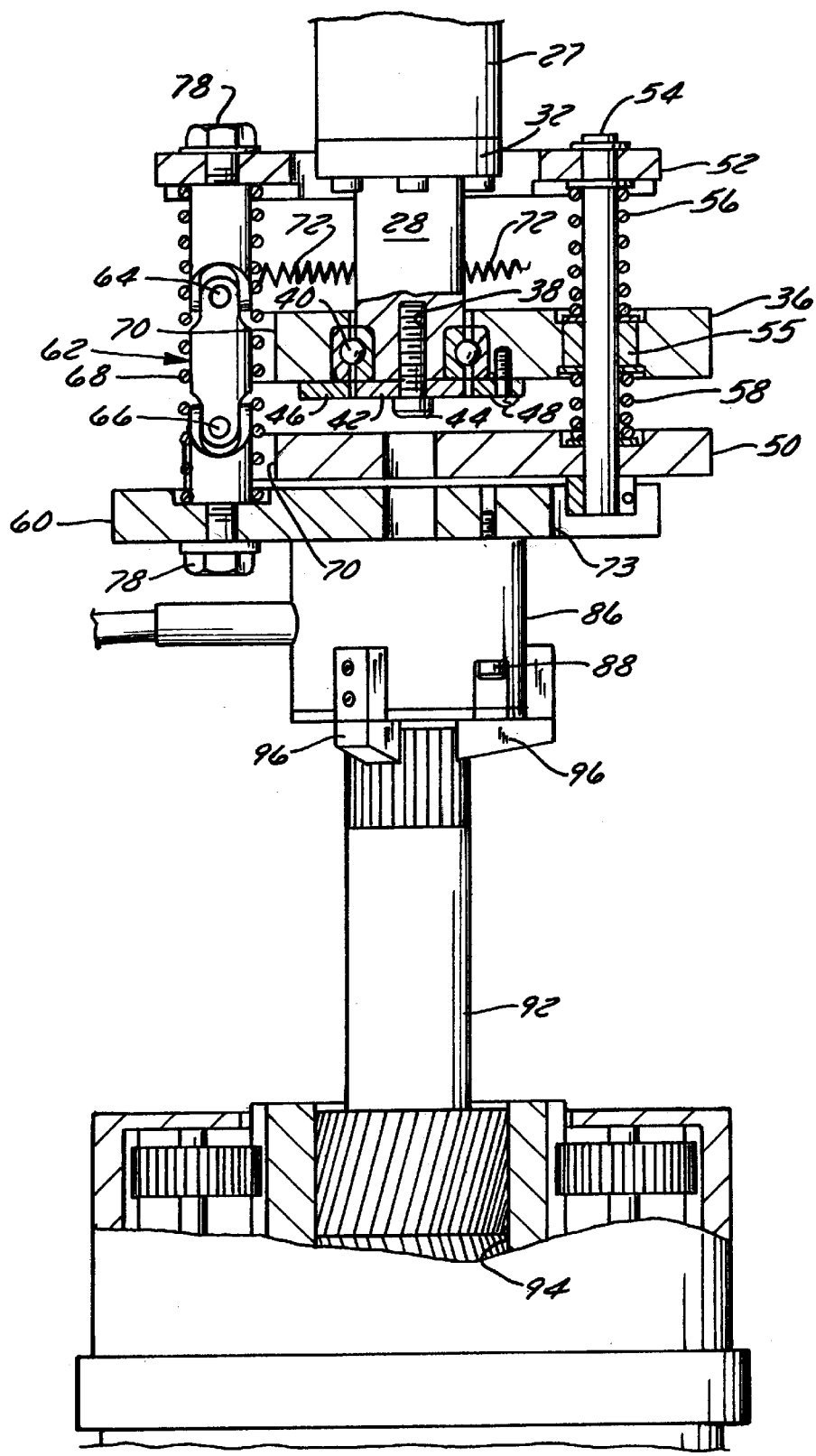
FIG. 6 is a fragmentary sectional side elevation view of the insertion mechanism of FIG. 5 showing the gear installed into the gear set.

The back-and-forth rotational iterations will continue until either 1) the gear 92 meshes with the mating gear(s) of the gear set 94, or 2) a number (e.g. 4) such back-and forth iterations take place without a meshing engagement occurring. If, as is the case in the vast majority of cases, the gear 92 rotates into initial meshing alignment with the mating gear(s) of the gear set 94 at some point during the iterative rotation process, any slight axial misalignment between the gear 92 and the mating gear(s) of the gear set 94 will be accommodated by passive movement of the double universal joints 62 in the x and/or y direction, at which point the gear 92 will mesh smoothly with the mating gear(s) of the gear set 94 and the plate 50, 52, and 60 and gear 92 will drop from the position shown in FIG. 5 toward the position shown in FIG. 6 under the force of gravity and the relatively light spring forces. As the plate 50 is lowered with respect to plate 36 during installation, the actuator arm 84 84 will move away from the switch 82, thereby deactivating the limit switch 80 to trigger the chuck 86 to release the gear 92 and to permit the gear 92 to fall the rest of the way into the gear set 94.

If, on the other hand, the robot 22 undergoes four iterations of rotational movement without being apprised of limit switch deactivation, the robot's control system will conclude that the parts have jammed and will control the robot 22 and chuck 86 to withdraw the gear 92 from the gear set 94 without releasing the gear 92 and re-initiate the insertion process.

Figure 7:
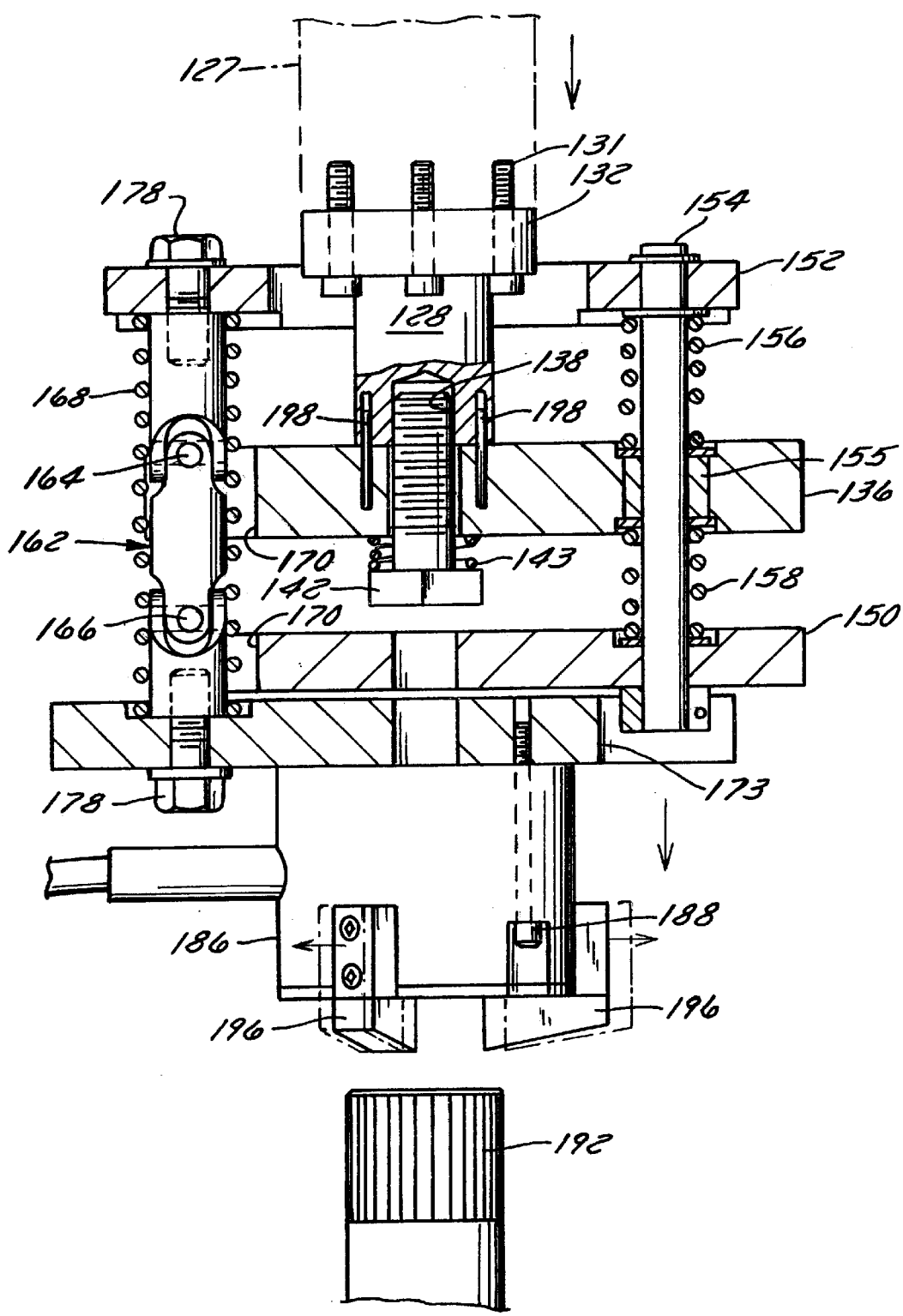
FIG. 7 is a sectional side elevation view of a gear insertion mechanism constructed in accordance with a second preferred embodiment of the invention.
Figure 8:
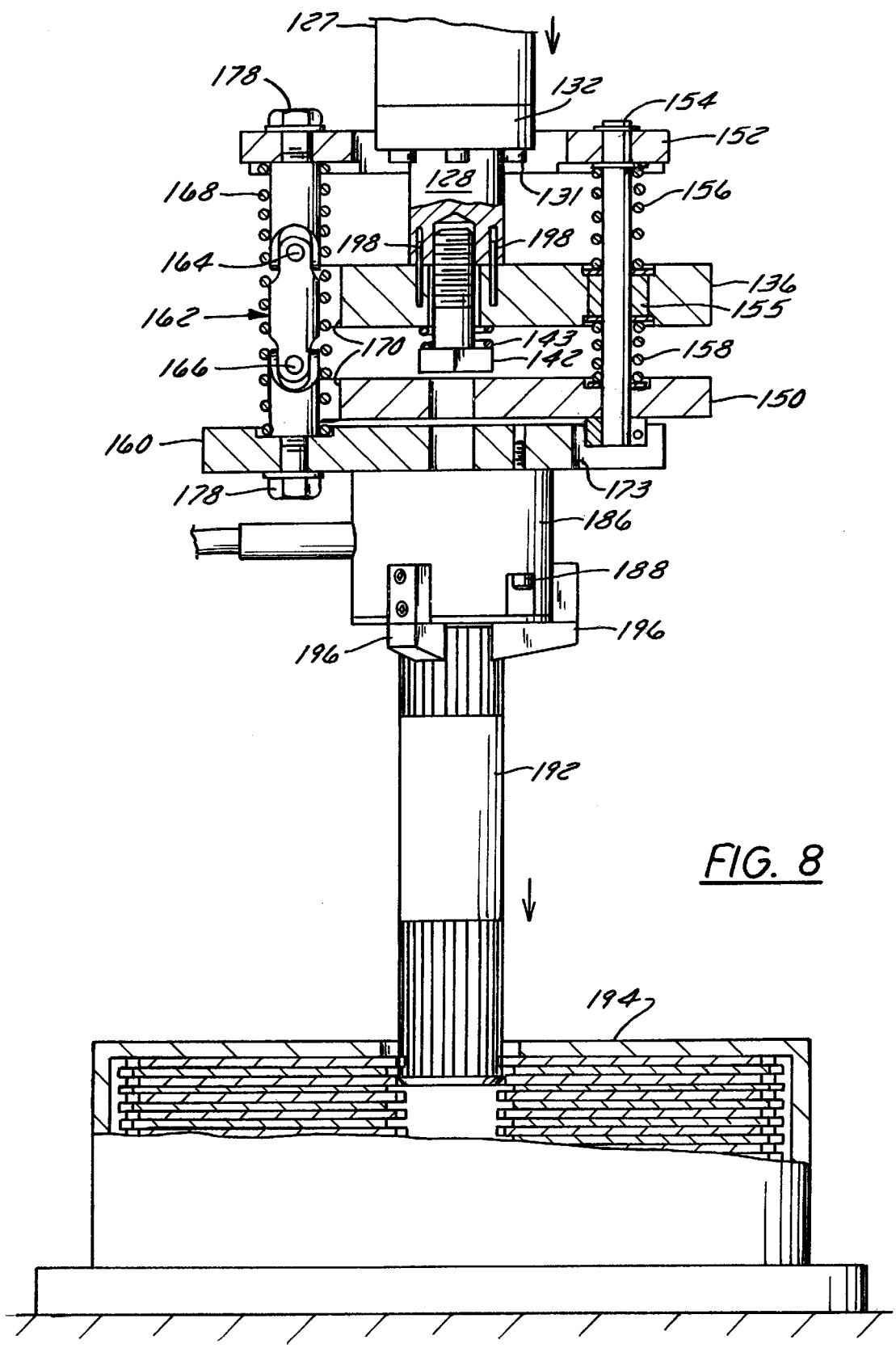
FIG. 8 is a sectional side elevation view of the insertion mechanism of FIG. 7 as a gear is installed into a gear set.

2. Construction and Operation of a Second Embodiment Having an Output Element with Three Degrees of Freedom Referring to FIGS. 7 and 8, an alternate embodiment is shown in which like reference numerals corresponding to like structures have been incremented by 100. This embodiment is preferred when rotation of the gear 192 relative to the mounting plate 132 is not necessary, such as is the case when gear 192 comprises a pinion gear, and the gear set 194 comprises a relatively light clutch pack as opposed to the relatively massive sun gears of the previous embodiment. The primary difference between the embodiment illustrated in FIGS. 7 and 8, and the embodiment illustrated in FIGS. 1–6, therefore, is the lack of rotational compliance of the insertion mechanism 126 relative to the shaft 128. The output plate 160 is instead fixed from rotation with respect to the main support plate 136. This is accomplished primarily through the provision of a lock assembly in the form of 1) rotational locking pins 198 that are inserted into the lower portion of the shaft 128 and also into the main support plate 136 and 2) a spring 143 that is disposed between the main support plate 136 and the head of the bolt 142 and that biases the main support plate 136 against the shaft 128. Because the insertion mechanism 126 is not permitted to rotate relative to the shaft 128, bearing 40 and springs 72 have been removed in this embodiment.

In operation, the robot 22 is controlled to generally align the gear 192 with the clutch pack 194 and to lower the insertion mechanism 126 a predetermined distance until the gear 192 contacts the gear set 194 as described above. The double universal joints 162 permit compliance generally along the x and y axes, and the plates 150 and 152 permit independent compliance generally along the z axis. The robot 22 then performs several rotational back-and-forth iterations of 120 degrees. These iterations permit the teeth of gear 192 to mesh with each individual clutch plate of the clutch pack 194 as the gear progressively drops through the clutch pack. Once a predetermined number (e.g., four) cycles of rotation has taken place to guarantee that the gear 192 has been successfully inserted into the clutch pack 194, the controller for the robot 22 activates the chuck 186 to release the gear 192.

The insertion mechanism 126 of this embodiment has three degrees of freedom (i.e., is compliant in the x, y, and z axes) and additionally permits passive insertion with low forces, as described above. Because no feedback to the robot is necessary to implement successful installation of the gear 192 into the gear set 194 in this embodiment, the limit switch 80 of the first embodiment may also be eliminated, but could be implemented if desired for added security.

Many changes and modifications may be made to the invention without departing from the spirit thereof. For instance, the invention is not limited to gear insertion mechanisms, but is also applicable to other situations in which a relatively rigid part needs to be inserted into an assembly. The scope of these and other changes will become apparent from the appended claims.

I claim:

1. A low-stiffness assemble assist mechanism for inserting a part into an assembly comprising:
    a mounting element that is configured for connection to a controller; and
    an output element that is connected to said mounting element at one end, and that is connected to a tool holder at a second end opposite said first end, wherein the tool holder receives the part that is to be inserted into the assembly,
    wherein said assembly assist mechanism lacks any powered actuators that translate said output element relative to said mounting element, wherein said output element is passively movable along a z axis relative to said mounting element in order to insert the part into the assembly, and wherein said movement in the z direction is independent of rotational movement of said out put element about the z axis.

2. The mechanism of claim 1, wherein the assembly assist mechanism comprises a gear insertion mechanism that is configured to insert a gear into a gear set.

3. A low-stiffness assembly assist mechanism for inserting a part into an assembly, comprising:
    a mounting element that is configured for connection to a controller; and
    an output element that is connected to said mounting element at one end, and that is connected to a tool holder at a second end opposite said first end, wherein the tool holder receives the part that is to be inserted into the assembly,
    wherein said output element is passively movable along a z axis relative to said mounting element in order to insert the part into the assembly, and wherein said movement in the z direction is independent of rotational movement of said output element about the z axis, and
    wherein said mechanism further comprises at least one double universal joint connected to said output element, which permits movement of said output element in the x and y directions relative to said mounting element.

4. The mechanism of claim 3, further comprising springs that are connected to said output element so as to permit said movement of said output element in the z direction relative to said mounting element.

5. The mechanism of claim 4, further comprising:
    a main support element; and
    a shaft connecting said main support element to said mounting element, wherein said main support element is connected to said shaft via a bearing, and wherein said main support element is rotatable about said shaft via the bearing.

6. The mechanism of claim 5, wherein rotation of said main support element rotates said output element.

7. The mechanism of claim 5, wherein said insertion mechanism includes a switch that generates a signal indicative of successful insertion of the part into the assembly.

8. The mechanism of claim 2, further including a lock assembly that prevents rotation of the part with respect to the mounting element.

9. A gear insertion mechanism for inserting a part into an assembly, comprising:
    a mounting element that is configured for connection to a controller; and
    an output element that is connected to said mounting element and to a tool holder, wherein said output element has at least four degrees of freedom with respect to said mounting element, and wherein said gear insertion mechanism lacks any powered actuators that translate said output element relative to said mounting element, wherein said output element is passively movable along a z axis relative to said mounting element in order to insert a gear into a gear set, and wherein said movement in the z direction is independent of rotational movement of said output element about the z axis.

10. The mechanism of claim 9, wherein said output element is translatable in a z direction and generally along a z axis relative to the mounting element, and is further rotatable about the z axis relative to the mounting element, and wherein rotation about the z axis occurs independently of said translation in the z direction.

11. A gear insertion mechanism for inserting a gear into a gear set, wherein said mechanism comprises:

a mounting element configured to connected to a controller; and an output element configured to receive a gear, wherein said gear insertion mechanism lacks any powered actuators and said output element is passively translatable generally along a z axis relative to the controller, and wherein said mechanism is rotatable about the z axis relative to the controller, and wherein said rotation takes place independently of said translation.

12. A gear insertion mechanism comprising:

a mounting plate that is connected to a controller;

a shaft that extends generally along a z axis and that is connected to said mounting plate;

a main support plate that is rotatably connected to said shaft via a bearing that permits rotation of said main support plate about the z axis; and an output plate that is connectable to a gear to be installed, and that is rotatably fixed to said mounting plate via a set of pins, wherein a set of springs surrounds said set of pin to permit movement of said output shaft generally along the z axis and relative to said mounting plate.

13. The mechanism of claim 12, further comprising a set of double universal joints that are connected to said output plate so as to permit translation of said output plate in a direction generally perpendicular to said z axis.

* * * * *